Oct. 17, 1933.   C. B. LANGSTROTH ET AL   1,930,649
ELECTRIC ARC WELDING ELECTRODE
Filed Oct. 24, 1931
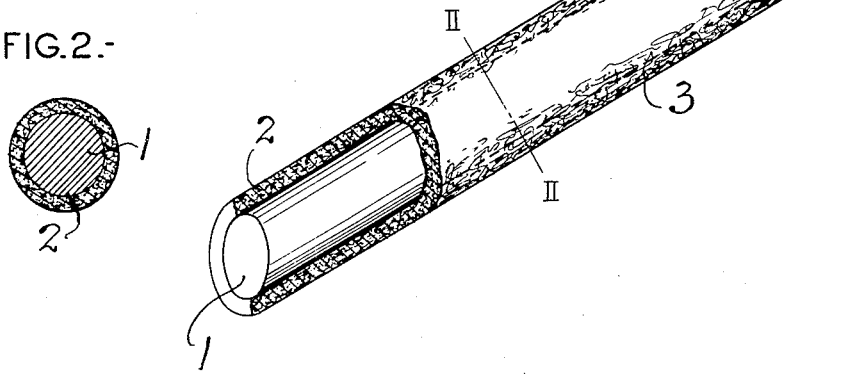
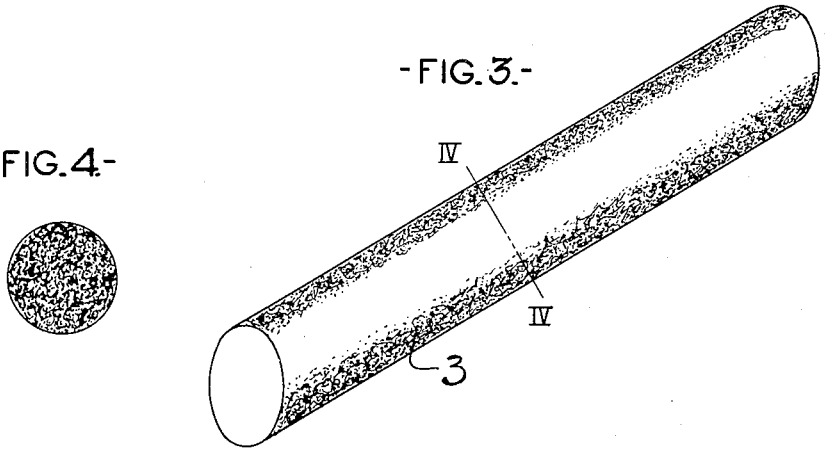
INVENTOR
Clifford B. Langstroth
Edwin M. Martin.
BY
ATTORNEY Patented Oct. 17, 1933

1,930,649

UNITED STATES PATENT OFFICE 1,930,649

ELECTRIC ARC WELDING ELECTRODE

Clifford B. Langstroth, Plainfield, N. J., and Edwin M. Martin, New York, N. Y.

Application October 24, 1931. Serial No. 570,834

14 Claims. (Cl. 219—8)

This invention relates to welding and particularly to improvements in electric arc welding electrodes.

An object of the present invention is to provide an improved electrode structure comprising means for protecting the fused metal of the weld against the deteriorating influences of the atmosphere.

A further object is to provide an electrode having the aforesaid characteristics, comprising a composition, preferably in the form of a coating for the metallic core of the electrode, which is characterized by a maximum degree of toughness, durability and elasticity.

A further object of the invention is to provide an electrode of the character described which is easy to manufacture and which comprises a composition that is capable of producing the desired results while being relatively inexpensive.

In the art of electric welding by the metallic arc welding process a metallic electrode, or weld rod, is heated to welding or fusing temperature by electric current, and the current passes between the electrode (the weld rod) and the body where the welding metal is to be deposited, forming an arc therebetween, and the fused metal passes through the arc from the electrode to the body. Special difficulties, however, are met with in that the constituents of the atmosphere, more particularly oxygen and nitrogen, act upon the molten metal and effect chemical reactions, i. e. oxidation and nitrogenization of the molten metal, which impair the quality of the weld and result in defective joints. It has been found in practice that it is desirable, if not necessary, to provide the weld rod with a composition usually in the form of a coating or cover, which during the welding operation will produce the following results: the coating will form a crater at the operating end of the rod, that is, the edges of the coating will extend a short distance beyond the end of the rod during the welding operation to direct the flow of the arc and the molten metal therein; as the rod of the metal diminishes in length the coating also diminishes, at an equal rate, so that the crater remains the same during the whole operation; the composition which is employed, preferably in the form of a coating, disintegrates and vaporizes, and the vapors provide a protecting envelope which surrounds the arc and the area where the molten metal is deposited, thereby affording a shield against the atmosphere for avoiding the undesirable influences thereof.

Various further mechanical, chemical and physical advantages are imparted to the weld by the inclusion of different ingredients in the weld rod either in its cover or in its metallic core. In the advance of the art many and various forms and kinds of weld rods, compositions and coatings have been made and used. The requirements of practice now call for a weld rod which will produce a superior weld and will comprise an improved rod, such as aforedescribed, characterized by toughness, durability and elasticity, and which at the same time is simple to manufacture and inexpensive in cost. The present invention provides an improved weld rod which meets all of the aforesaid requirements. It will be understood that in this description and in the appended claims where the word "electrode" is used it is intended to mean a weld rod electrode.

In the accompanying drawing, there are illustrated specific weld rods embodying the instant invention; Figure 1 being a perspective view of one of the weld rods; Fig. 2, a section on the line II—II of Fig. 1; Fig. 3, a perspective view of another form of rod; and Fig. 4, a section on the line IV—IV of Fig. 3.

Referring in detail to the drawing, the rod of Fig. 1 comprises a metallic core 1 having a coating 2 formed thereon. The coating 2 comprises a composition containing the desirable elements for producing the vapor envelope and reacting in the desired manner hereinafter more fully described. One of the ingredients of the coating is a carbohydrate material. This is preferably a cellulose such as wood, corn cobs or like substances. In the specific embodiment illustrated in Figs. 1 and 2, pine wood is employed. Heretofore, such materials have been used in powder or granular form. One of the important novel features of the instant invention, however, is that this basic material, i. e. the pine wood, is employed in shredded form. As hereinafter pointed out, however, the present invention is not limited to the use of pine wood but any carbo-hydrate material in shredded form may be employed. The shreds 3 are mixed through the composition and provide the highly desirable quality of holding the material together and making for an especially tough and durable composition. Such substance also has the advantageous quality of being extremely inexpensive and simple to manufacture and apply. Further, the material is particularly adapted for producing the desired vapor during the welding operation and protecting the weld from the deteriorating influences of the atmosphere.

To act as a binder for the coating, silicate of soda is employed as one of the ingredients. The silicate of soda also serves to quiet the arc and refine the melted material during the welding operation. Calcium carbonate may be also added to lower the melting point at which the arc will hold and thereby allow a lower temperature and diminish the chance of carbon or other desirable elements being lost.

In the preferred coating, a reducing agent, such as silico-manganese, is also mixed. In the welding operation it is desirable to deoxidize the iron oxides and this agent serves to reduce the oxides from the deposited metal.

In order to retard the combustion of the coating so that the crater will be at the end of the core at all times during the welding operation, as the core diminishes, there is mixed with the coating material a substance, such as clay. In the preferred form, kaolin is employed.

There may be further introduced into the mixture a hydrocarbon oil preferably of the non-drying variety such as peanut oil. This ingredient has the advantage, especially when used with the shredded cellulose, of making for a more elastic coating so that the rod when necessary may be curved or bent without causing a crumbling or cracking of the composition.

In the preferred embodiment of the invention the proportionate amounts of the ingredients comprised in the coating are as follows: shredded wood—100 parts; sodium silicate—80 parts; calcium carbonate—5 parts; kaolin—5 parts; silico-manganese—5 parts; peanut oil—5 parts. These materials are mixed together and a coating is applied as a plastic mass to the core 1 by passing the core through a stuff chest and baking or drying the same to the desired hardness. As hereinafter further mentioned, however, weld rods embodying the instant invention may embody only a part of these materials and in different proportions, the principal part of the present invention being the employment of a shredded carbo-hydrate material, and the addition of the other ingredients, while not necessary to the principal part of the invention, constituting additional features of the invention which may or may not be employed as desired.

The core of the weld rod may be of a metal of any desired nature and it is within the contemplation of the present invention to either apply the coating material as a cover to the rod, as aforedescribed, or to incorporate the plastic mixture in cavities formed in the sides of the weld rod, in a center bore formed within the core or in any other manner which may prove desirable.

Likewise, the metallic element may, instead of being in the form of a core, be employed in granular form and incorporated with the plastic mixture. A weld rod so constructed is illustrated in Figs. 3 and 4. Here, all the materials of the composition of the rod coating described with reference to Figs. 1 and 2, are employed, including the shredded pine wood. This composition is mixed with granulated welding metal in proportions of approximately one to ten respectively, so that the metallic particles will be sufficiently close together to insure an unbroken electric circuit. The employment of the shredded material is especially advantageous in this instance because of its functioning to hold the several materials of the rod together.

The novel subject matter described in this application but not specifically claimed herein forms the subject matter of a co-pending application of applicants herein, Serial No. 607,734, filed April 27, 1932.

While there has been hereinbefore recited certain specific ingredients and definite proportions of ingredients for the weld rod composition, it will be understood that the instant invention is not limited to the use of all the ingredients or to the ingredients described, or the proportions specified, but that part of the ingredients, and any like substances, having similar properties, may be employed in various proportions, and that all and any such changes and modifications as fall within the scope of the appended claims are contemplated as a part of the present invention, the essential part of the invention being the employment of the shredded material in connection with the weld rod.

We claim:

1. An electrode for use in arc welding, in which a metallic core is coated with shredded vapor-forming material for the purpose and substantially as described.

2. An electrode for arc welding, comprising a metallic rod provided with a coating containing a cellulosic material in shredded form.

3. An electrode for electric arc welding, comprising a metallic rod having a mixture containing a shredded cellulosic material as its principal constituent associated therewith and distributed substantially uniformly throughout its length.

4. An electrode for electric arc welding, comprising a metallic rod provided with a coating containing a shredded cellulosic material as its principal constituent, and a binder therefor.

5. An electrode for electric arc welding, comprising a metallic rod provided with a coating containing a shredded cellulosic material as its principal constituent, a binder therefor, and a combustion retarding material.

6. An electrode for electric arc welding, comprising a metallic rod provided with a coating containing a shredded cellulosic material as its principal constituent, a binder therefor, and an oxide reducing material.

7. An electrode for use in electric arc welding, in which a metallic core is coated with a shredded carbohydrate material for the purpose and substantially as described.

8. An electrode for electric arc welding, comprising a metallic rod provided with a coating containing a shredded cellulosic material as its principal constituent, and sodium silicate.

9. An electrode for electric arc welding, comprising a metallic rod provided with a coating containing a shredded cellulosic material as its principal constituent, and silico manganese.

10. An electrode for electric arc welding, comprising a metallic rod provided with a coating containing a shredded cellulosic material as its principal constituent, and a material for retarding combustion.

11. An electrode for electric arc welding, comprising a metallic rod provided with a coating containing a shredded cellulosic material as its principal constituent, and kaolin.

12. An electrode for electric arc welding, comprising a metallic rod provided with a coating containing a shredded cellulosic material as its principal constituent, and a hydrocarbon oil.

13. An electrode for electric arc welding comprising a metallic rod provided with a coating containing shredded wood as its principal constituent.

14. An electrode for electric arc welding comprising a metallic rod, and a coating therefor comprising a mixture containing a cellulosic material as its principal constituent, the parts of said material being in shredded form and overlapping and commingling so as to provide a matted structure throughout said mixture.

CLIFFORD B. LANGSTROTH.
EDWIN M. MARTIN.